Aug. 10, 1965 S. OKWIT 3,200,353
MICROWAVE STRUCTURE UTILIZING FERRITE COUPLING MEANS
Filed Feb. 14, 1962 2 Sheets-Sheet 2

INVENTOR
Seymour Okwit
BY Darris Edmonds, Morton, Barrows & Taylor
ATTORNEYS

Aug. 10, 1965 S. OKWIT 3,200,353

MICROWAVE STRUCTURE UTILIZING FERRITE COUPLING MEANS

Filed Feb. 14, 1962 2 Sheets-Sheet 1

INVENTOR
Seymour Okwit
BY
Amis Edwards Morton Barrows & Taylor
ATTORNEYS

United States Patent Office 3,200,353
Patented Aug. 10, 1965

3,200,353

MICROWAVE STRUCTURE UTILIZING FERRITE COUPLING MEANS

Seymour Okwit, Plainview, N.Y., assignor to Cutler-Hammer, Inc., Milwaukee, Wis., a corporation of Delaware Filed Feb. 14, 1962, Ser. No. 173,188
3 Claims. (Cl. 333—24.1)

This invention relates to microwave slow-wave structures, and particularly slow-wave structures utilizing ferrite bodies as coupling elements.

Slow-wave structures are used for many purposes, for example to increase the interaction of signal energy with paramagnetic material in masers, to provide slow-wave propagation in traveling-wave tubes, as a bandpass filter, etc.

Comb structures using aligned parallel arrays of resonant elements, usually quarter-wave elements, have been used to provide bandpass, reciprocal slow-wave structures. Normally, there is little or no coupling between the resonant elements per se of such a structure, because the capacitive and inductive components of coupling between them are equal and opposite, and therefore, cancel out. Conventionally, the resonant elements are aligned in a metal enclosure having bottom, side and top plates, and coupling is achieved by positioning the top plate sufficiently close to the free ends of the quarter-wave elements to provide capacitive coupling therebetween.

In such a structure the capacitive coupling is reciprocal and independent of power level. The width and frequency location of the passband is determined by the length of the rods, the amount of capacitive coupling, etc., and adjustment thereof in inconvenient. Ferrites are sometimes used in such structures to introduce losses in one direction but not the other, thereby providing a nonreciprocal structure, but the other disadvantages remain.

The present invention is directed to a microwave slow-wave structure employing parallel aligned resonant elements which have negligible capacitive coupling therebetween, and coupling is obtained by the use of ferrite bodies operated at or near a resonant peak to provide a permeability greater than unity. The ferrite bodies are positioned in the magnetic field of the resonant elements so as to provide inductive coupling therebetween.

It is particularly contemplated to select the ferrite material and the location of the ferrite bodies so as to produce a limiting action. Thus, with a suitable choice the structure will pass signals up to a certain power level, and limit them thereafter. This action has important advantages in many applications, such as preventing damage of subsequent equipment by excessively high power levels, reducing the jamming effect of strong signals, etc.

Further advantages may also be obtained. With narrow line width ferrite materials, a narrow passband can be obtained and his may be tuned over a range by changing the D.C. magnetic field applied to the ferrites. Also, by switching of the D.C. field, transmission through the structure may be stopped. In addition, by suitable positioning of the ferrite bodies the coupling between the resonant elements may be made effective in one direction only, thereby yielding a nonreciprocal structure.

These and other advantages will be apparent from the detailed description given hereinafter.

Ferrites are now well known, and their properties at microwave and other frequencies have been extensively explored both theoretically and experimentally. The term "ferrite" was initially applied to ferromagnetic materials having the formula $MO \cdot Fe_2O_3$, where M represents a bivalent metal, and usually having a cubic spinel crystal structure. However, at the present time the term is applied more broadly by many workers in the field, and includes other materials having similar magnetic properties. Among these are rare earth garnets having a garnet rather than a spinel crystal structure, such as yttrium-iron-garnet (often referred to as "YIG").

In the present application the term "ferrite" will be used in its broader sense.

At microwave frequencies, and in the presence of a steady or D.C. magnetic field (H) of suitable direction, ferrites exhibit gyromagnetic phenomena due to the spin behavior of the elementary magnetic dipoles thereof. In general, when a D.C. magnetic field is applied and the alternating magnetic field has a component perpendicular thereto, the spins precess at a frequency depending upon the D.C. field strength. When the alternating frequency is equal to the processing frequency, ferromagnetic resonance occurs and the alternating frequency energy is strongly absorbed. The frequency at which this occurs is termed the ferromagnetic resonance frequency.

Ferromagnetic resonance is commonly described by plotting the relative permeability or susceptibility of the ferrite as a function of the D.C. magnetic field or the RF frequency. Thus if permeability is plotted as a function of H, for a fixed RF input frequency, a peak is observed in the region of ferromagnetic resonance.

The effective permeability is a complex quantity and has real and imaginary components. The real component commonly produces a reactive effect. The imaginary component is often termed the "loss" component, since it is responsible for absorption of power. In the present invention the imaginary component is primarily relied upon for producing the desired coupling. However, preferably a low loss ferrite is employed so as to effect coupling without excessive losses.

In general, at low RF power levels a ferrite behaves as a linear circuit elements. However, when the RF level exceeds a critical value depending upon the material the permeability in the main resonance region changes markedly, and ultimately becomes very small. Also, an absorption peak commonly occurs at a lower value of H in what is called a subsidiary resonance region.

The permeability of a ferrite for a given D.C. magnetic field depends upon the sense of polarization of the RF magnetic field about the ferrite with respect to the direction of the D.C. magnetic field. The aligned spins contributing to the magnetization of a ferrite in a D.C. magnetic field precess thereabout. The spin orientations tend to align with the direction of that field because of damping forces, so that normally spin precession is damped out. However, when there is an RF magnetic field normal to the D.C. magnetic field which is circularly polarized, or has a circularly polarized component and the direction of rotation of the magnetic field is the same as that of the precessing spins, the torque exerted on the spins tends to shift their orientation from alignment with the D.C. magnetic field and the spins continue to precess, with the angle of precession increasing or "fanning out" with respect to the direction of the D.C. magnetic field. This produces a peak of the imaginary component of the permeability tensor.

If, however, the sense of polarization is such that the RF magnetic field rotates in a direction opposite to the direction of rotation of the precessing spins, then the force or torque exerted by the RF field is negligible and the spin alignment established by the D.-C. magnetic field is unaffected. In such case, the effective permeability is approximately that of free space, near unity.

In accordance with the present invention, a slow-wave structure composed of a plurality of parallel resonant elements aligned in an array is employed, and a body of ferrite material is positioned between each adjacent pair of the resonant elements in a region of relatively high RF magnetic field. A source providing a D.C. magnetic field is used. That field should have a substantial component in a plane perpendicular to the direction of propagation along the array. In the absence of the D.C. magnetic field the coupling between the resonant elements is negligible, whereas in the presence of the field there is substantial coupling through the ferrite material between adjacent resonant elements.

The invention will be further described in connection with specific embodiments thereof.

Figures 1, 2, 3, 4, 5:
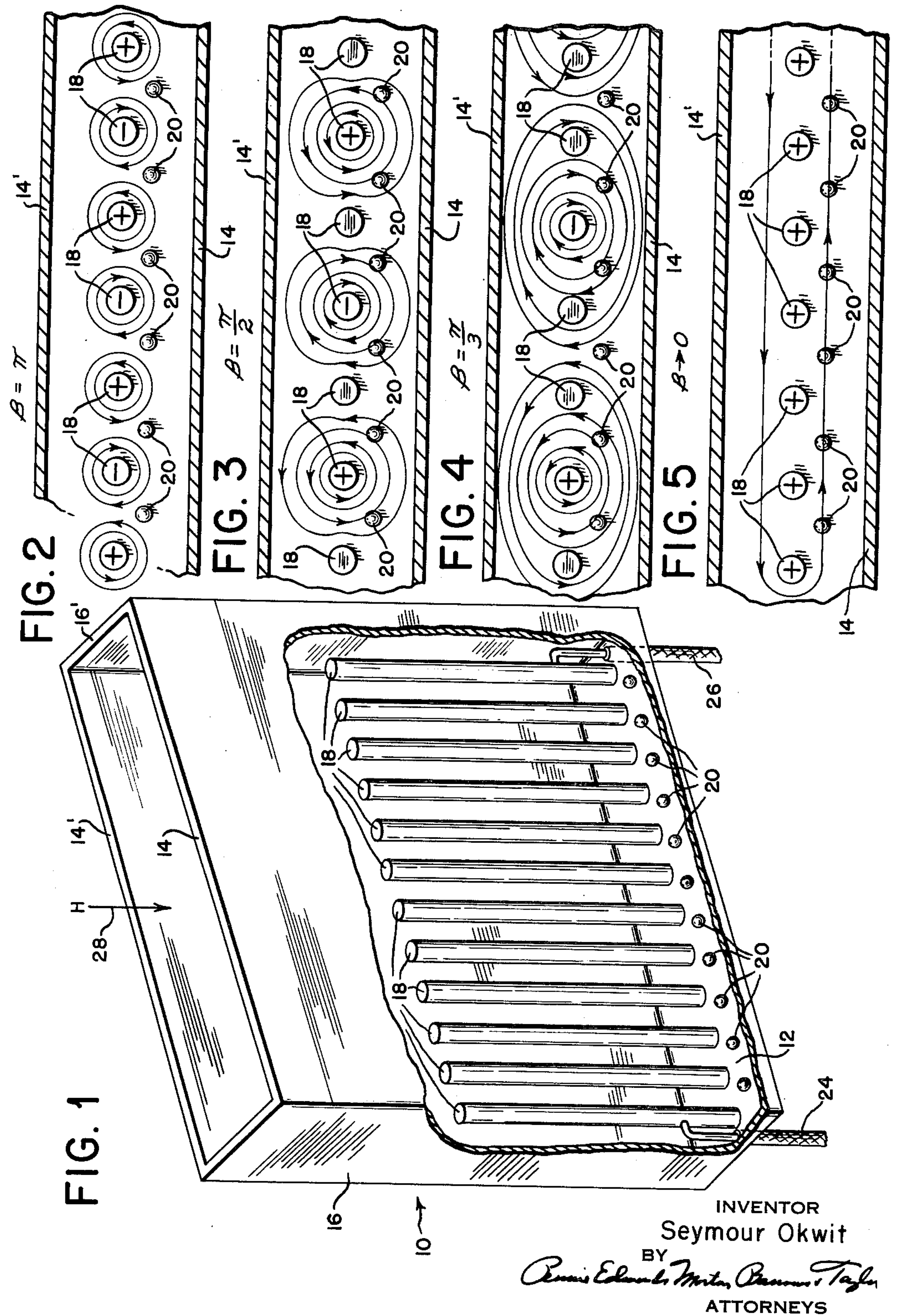
FIG. 1 is an oblique, partially-sectional view of a slow-wave structure in accordance with the invention.
FIGS. 2–5 are plan views of the structure of FIG. 1 illustrating the type of magnetic-field pattern existing around the resonant elements for various phase shifts per section.

Referring to FIG. 1, a slow-wave structure 10 includes a bottom ground plane 12, sides 14, 14′ and ends 16, 16′, of a conductive metal. The top is shown open, although it could be closed if sufficiently far away from the resonant elements so as not to introduce appreciable capacitive coupling.

On the bottom ground plane 12 are mounted a plurality of parallel, spaced, vertical rods 18 aligned on the lengthwise centerline of the ground plane and functioning as quarter-wave resonant elements.

Ferrite bodies 20, here shown as spheres, are positioned on the bottom plane opposite the spaces between the rods 18, and between the centerline of the bottom plane and one side wall 14. The exact positioning of the ferrite bodies depends upon the application, and will be described later. However, in general they should be located in a region of relatively high RF magnetic field.

Coupled to the rods at respective ends of the array are a coaxial input line 24 and an output line 26, the center conductors being attached to the rods a suitable distance from the bottom ground plane 12 to provide the desired impedance match. Many other forms of coupling can be used as will be understood by those skilled in the art.

A steady D.C. magnetic field indicated by an arrow 28 and the symbol H is directed towards the ferrite spheres 20 in a direction parallel to the axes of rods 18. This field may be produced by a permanent magnet or an electromagnet. Such structures are well known and are omitted to avoid confusion.

Input signals in the TEM mode of propagation are coupled to the rod 18 on the left end of the array through input line 24. A modified TEM mode of propagation exists about the rods 18 when coupling between them permits propagation. Thus the propagation may be considered as traveling up one rod or series of rods, down the next rod or series of rods, etc., depending on the phase shift per section, with an overall direction of propagation along the array. This type of propagation is known in the art and the field patterns are those of a comb-type slow-wave structure.

As has been explained above, the coupling between adjacent resonant elements 18 in the absence of perturbation of the field is negligible. In this structure however, inductive coupling is obtained through the permeability of the ferrite spheres 20 when a magnetic field H of suitable strength is applied. This aspect will be described later. For the moment, coupling will be assumed to exist and the RF field configurations will be described.

FIGS. 2–5 illustrate the types of RF magnetic field configurations which will exist for phase shifts $\beta l$ between successive resonant elements (phase shift per section) of $\pi$, $\pi/2$, $\pi/3$ and approaching zero, respectively. No attempt has been made to show the exact configurations, since they are well known in the art.

FIGS. 2 and 5 represent limiting conditions where there is little or no propagation. In FIG. 2 the potential of successive elements reverses, so that the RF magnetic field lines encircle substantially single elements. As the phase shift decreases, the magnetic field lines encircle more and more elements until finally, near zero phase shift, they encircle a very large number of elements.

The configurations shown are for a given instant in time. As time proceeds, the configurations will travel down the array of elements at the velocity of propagation. Thus it will be seen that near the side walls the magnetic field lines will be generally parallel to the walls, changing from plus to minus and vice versa, as propagation proceeds. Thus the polarization will be essentially linear. Directly between the elements, the magnetic field lines will be generally perpendicular to the center line of the array, and hence substantially linear polization perpendicular to the center line will exist.

In going from a wall to the center line, the polarization will change from linear parallel to the walls, through elliptical with the major axis parallel to the walls, to circular; and then through elliptical with the major axis perpendicular to the walls, to linear perpendicular to the walls. It will therefore be seen that by positioning the ferrite bodies at an appropriate distance between center line and wall, they will be in an RF field which is circularly polarized. This permits nonreciprocal transmission, as will be explained later.

The strength of the RF magnetic field also varies with distance from center line to wall. Thus the field directly between the elements is relatively weak, that near the wall is also weak, and at some point in between is maximum.

The exact lateral position of the ferrite bodies will depend on the particular application, a position about one-third of the distance between centerline and sidewall having been found satisfactory in one embodiment.

Considering now the ferrite coupling mechanism, the permeability of a ferrite body in a D.C. magnetic field normal to an RF magnetic field shows a strongly resonant characteristic at ferromagnetic resonance. The permeability is usually expressed as a permeability tensor, wherein $\mu$ is the diagonal component and $k$ is the off-diagonal component. Each of these is a complex quantity. The diagonal component is composed of a real part $\mu_e'$ and an imaginary part $\mu_e''$.

Figure 7:
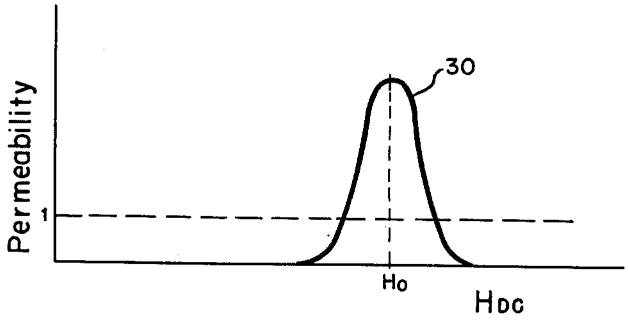
FIG. 7 is a curve illustrating the effective imaginary component of the permeability tensor as a function of the D.C. magnetic field for a given RF frequency.

In FIG. 7 the imaginary component $\mu_e''$ is shown as a curve 30 plotted as a function of the D.C. magnetic field $H_{DC}$ for a given RF frequency and positive circular polarization. It can be seen from the curve that for a given D.C. field $\mu_e''$ will reach a peak considerably greater than unity. Above and below a center peak value $H_0$, the value of $\mu_e''$ slopes sharply down to a small value. The slope is steeper for single crystal ferrites which have narrow line-widths than it will be for polycrystalline materials. At $H_0$, as is well known, gyromagnetic resonance obtains for a positively polarized field because the RF field rotates at the same angular velocity and in the same direction as the magnetization vector which is forced to precess by the D.C. magnetic field.

A similar characteristic can be obtained by plotting permeability versus frequency for a given D.C. magnetic field.

In accordance with this invention inductive coupling is provided between the parallel resonant elements primarily through the imaginary portion of the diagonal component of the permeability tensor, when operating in the region of main ferromagnetic resonance. Inasmuch as the ferrite bodies are essentially resonators and are coupled to adjacent resonant elements 18, mutual loading is present and energy is coupled into and out of the ferrite bodies at a rate rapid enough to avoid excessive power loss therein due to the precession mechanism. However, low-loss ferrites are advantageously employed to avoid other types of losses, such as dielectric and domain losses. Depending on the exact location of the ferrite bodies, the imaginary portion of the off-diagonal component may also play a part in the coupling.

With operation in the region of main ferromagnetic resonance, as the RF power level in the ferrite increases a critical value is reached beyond which the ferrite becomes non-linear, that is, the permeability begins to change. In general, beyond a rather sharply defined threshold value the main resonance line weakens and broadens steadily. Thus the effective permeability decreases and the coupling between elements decreases.

As a result, beyond an input RF power level in the structure which produces the threshold value in the ferrite bodies, limiting occurs and there is little increase in output power over a considerable range. The point at which limiting begins depends on the ferrite material and the strength of the RF magnetic field where the ferrite bodies are located. Single crystals of YIG have been found particularly suitable, since they are narrow-line and low-loss, and the threshold of non-linearity occurs at a low RF power level. By changing the location of the ferrite bodies either laterally along the bottom plate 12, or upwards from the bottom plate, the strength of the RF magnetic field in the ferrite bodies may be changed, thus affording a means of selecting the input RF power at which limiting occurs.

Figure 6:
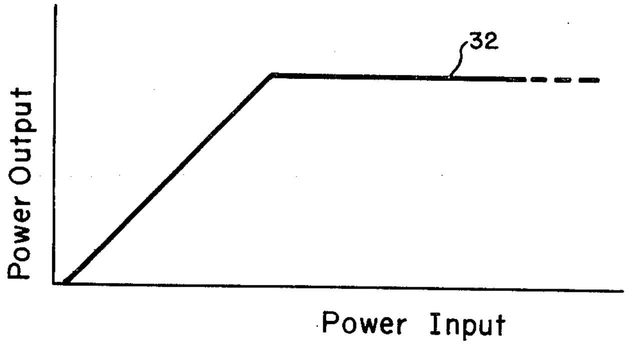
FIG. 6 illustrates power limiting in accordance with the invention.

FIG. 6 illustrates limiting action. Here curve 32 shows power output as a function of power input. Curve 32 is linear until the critical RF power level is reached. Above this level the curve is constant. The limiting action is somewhat idealized, the exact characteristic depending on the detailed design. Considerable variations are possible. For example, the horizontal portion may be somewhat concave or convex.

Figure 8:
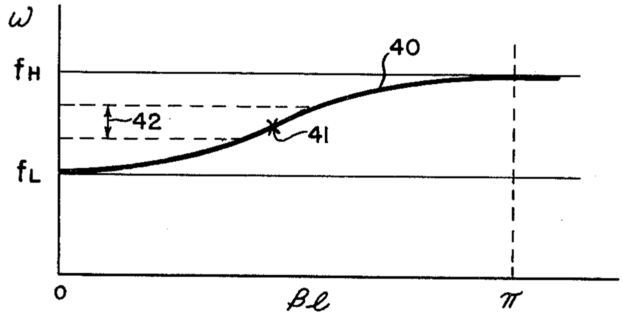
FIG. 8 illustrates the relationship between RF angular velocity and phase shift per section for the structure of FIG. 1.

The performance of the structure shown in FIG. 1 can be expressed in terms of an $\omega$-$\beta$ diagram such as that shown in FIG. 8. Diagrams of this type are used increasingly in the art and a great deal of information can be obtained therefrom. Since $\omega$ is equal to $2\pi f$, it is commonly referred to as the angular frequency or simply "frequency." The ratio of $\omega$ to $\beta$ at any point on such a curve gives the phase velocity $V_f$. The slope of the curve gives the group velocity $V_g$. If $V_g$ and $V_f$ are of the same sign, there is traveling-wave propagation. If they are of opposite sign, there is backward-wave propagation. A zero slope indicates no propagation, or zero passband at that point, hence indicating cutoff.

The horizontal coordinate is denoted $\beta l$ and is the phase shift per section of an artificial transmission line or an equivalent unit length of a distributed transmission line.

Curve 40 is typical of a comb-type structure for a given amount of coupling effective throughout the range from a low frequency value $f_L$ to a high frequency value $f_H$. At the extremes, $\beta l$ has respective values of 0 and $\pi$, and the zero slopes at these points indicate cutoff. In general, the available passband is a function of the amount of coupling, the detailed design of the resonant elements, the loading, etc., as is understood by those skilled in the art.

With the coupling provided by the ferrite bodies, the line-width of the ferrite and the corresponding frequency band over which the coupling is effective may be substantially less than the available passband from $f_L$ to $f_H$. Thus for any given applied D.C. magnetic field, a narrower passband may be obtained, and by changing the D.C. field this narrower passband may be located as desired within the broader available passband.

For example, if the D.C. magnetic field is selected to establish ferromagnetic resonance at an RF frequency corresponding to point 41 on curve 40, the resulting coupling with a narrow-line ferrite will be effective over a range such as shown at 42. Thus only signals within the passband 42 will pass through the transmission line of FIG. 1.

Figure 9:
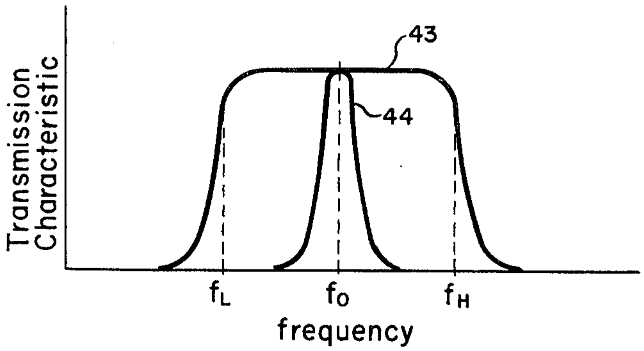
FIG. 9 illustrates transmission characteristics obtainable with the arrangement of FIG. 1 as a function of frequency.

In FIG. 9 the transmission characteristic is expressed as a function of frequency for the conditions shown in FIG. 8. The curve 43 indicates the maximum possible passband of the comb-structure and curve 44 indicates the passband of the ferrite-coupled structure for a given ferromagnetic resonance frequency corresponding to point 41 in FIG. 8. By varying the D.C. field, the passband 44 can be moved as desired within the available passband 43.

The line-width of a ferrite body depends not only on its material but also its physical shape, thus affording control over the width of passband 44. By using two or more ferrite bodies of different sizes, shapes, and/or material to provide coupling between the pairs of resonant elements, a broader bandwidth can be obtained as each ferrite body of a given coupling assembly will have a different line-width and/or ferromagnetic resonance frequency for a given D.C. magnetic field. An asymmetric D.C. magnetic field can also be provided to alter the response of spaced ferrite bodies 20 between each pair of rods 18, so as to give staggered passbands.

The RF magnetic field varies in magnitude from a maximum at the grounded ends of the resonant elements 18 to a minimum at the open ends thereof. For that reason coupling is greater for a given RF power level if the ferrite bodies 20 are located adjacent the grounded ends of the resonant elements. Also limiting will occur at lower power levels of the signal when the ferrite bodies are near the grounded ends, as more of the magnetic field will pass through the ferrite.

For nonreciprocal transmission, the lateral position of the ferrite bodies may be selected so that they are in a region of the RF magnetic field where substantially circular polarization exists. In such case, a transmission direction which produces positive circular polarization in the ferrite bodies for a given direction of D.C. field, will produce a strong interaction with the spin precession and accordingly coupling will exist. An attempted transmission in the reverse direction will produce negative circular polarization in the ferrite bodies, so that there will be little interaction and the permeability will remain at a low value. Thus substantially no coupling will exist in this reverse direction.

Since coupling requires an applied D.C. magnetic field, the structure can be operated as a bandpass filter which can be switched "on" or "off" by applying and removing the D.C. field. In addition, the bandpass range of frequencies can be tuned as described with reference to FIGS. 8 and 9.

As a limiter, the structure has the important advantage that limiting of a strong signal within the passband (for example, 44 of FIG. 9) can be effected while continuing to pass low power signals at other frequencies within the passband. This is possible because one body of ferrite material can simultaneously have widely different values of $\mu_e''$ within its line-width for adjacent frequencies above and below the critical power level respectively.

Operation of the ferrite bodies in the region of the main ferromagnetic resonance has been particularly described above and is preferred. However, within the broad scope of the invention, operation in other regions is possible where a marked change in permeability occurs for a particular relationship of D.C. magnetic field, RF frequency, and RF power level. An example is the subsidiary resonance region which builds up at high power levels in many ferrites.

The invention has been particularly described in connection with comb-type structures using quarter-wave grounded resonant elements. However, it may also find application in other specific arrangements wherein parallel resonant elements of an array are uncoupled per se, with ferrite bodies arranged in the magnetic fields thereof to provide inductive coupling therebetween.

I claim:

1. A microwave slow-wave structure which comprises
   (a) a plurality of parallel resonant elements aligned in an array and adapted to transmit RF signal energy within a predetermined frequency range when coupling is provided therebetween,
   (b) signal input and output means coupled to the array,
   (c) a body of ferrite material positioned laterally of the space between each pair of resonant elements in a region of substantially circular polarization and relatively high intensity of the RF magnetic field to provide coupling of the resonant elements for RF transmission in one direction but substantially no coupling for RF transmission in the opposite direction,
   (d) said ferrite bodies having a peak in the permeability characteristic thereof in the presence therein of an RF magnetic field and a D.C. magnetic field of corresponding strength,
   (e) and means for applying a D.C. magnetic field to the ferrite bodies predetermined to produce a permeability peak at an RF frequency within said predetermined range and thereby coupling of the respective pairs of resonant elements, (f) the coupling between the resonant elements within said RF range being small in the absence of the D.C. magnetic field.

2. Apparatus in accordance with claim 1 in which the D.C. magnetic field corresponds to main ferromagnetic resonance and the amplitude of said permeability peak decreases for RF magnetic fields above a threshold level, whereby said coupling decreases for RF input powers above a threshold level and limits the power output corresponding thereto.

3. Apparatus in accordance with claim 1 in which the ferrite bodies are single crystal spheres of yttrium-iron-garnet.

References Cited by the Examiner

UNITED STATES PATENTS

| | | | |
|---|---|---|---|
| 2,777,906 | 1/57 | Shockley | 333—24 |
| 2,806,972 | 9/57 | Sensiper | 333—24 |
| 2,888,597 | 3/59 | Dohler | 333—31 |
| 2,899,597 | 8/59 | Kompfner | 333—31 |
| 2,911,554 | 11/59 | Kompfner | 333—31 |
| 2,922,917 | 1/60 | Kompfner | 333—31 |
| 2,930,927 | 3/60 | Sensiper | 333—31 |
| 2,941,114 | 6/60 | Cook | 333—31 |
| 3,074,023 | 1/63 | Apgar | 330—4 |
| 3,113,278 | 12/63 | Okwit | 333—83 |

HERMAN KARL SAALBACH, *Primary Examiner.*